Dec. 16, 1947.  W. J. TAYLOR, JR  2,432,834
SOLDERING MACHINE
Filed May 17, 1945  3 Sheets-Sheet 1

INVENTOR
William J. Taylor, Jr.
By
Mason, Porter & Diller
Attys

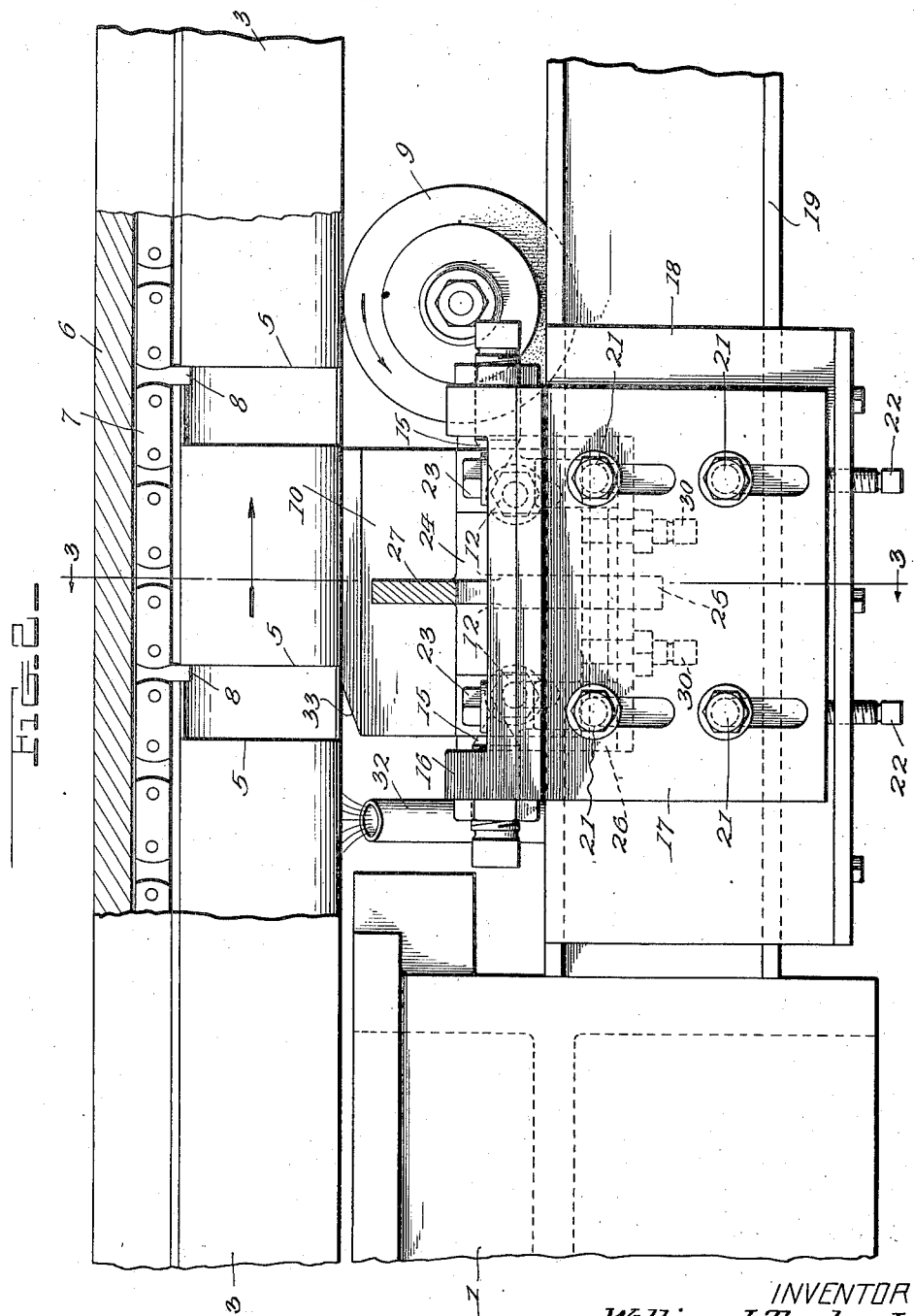

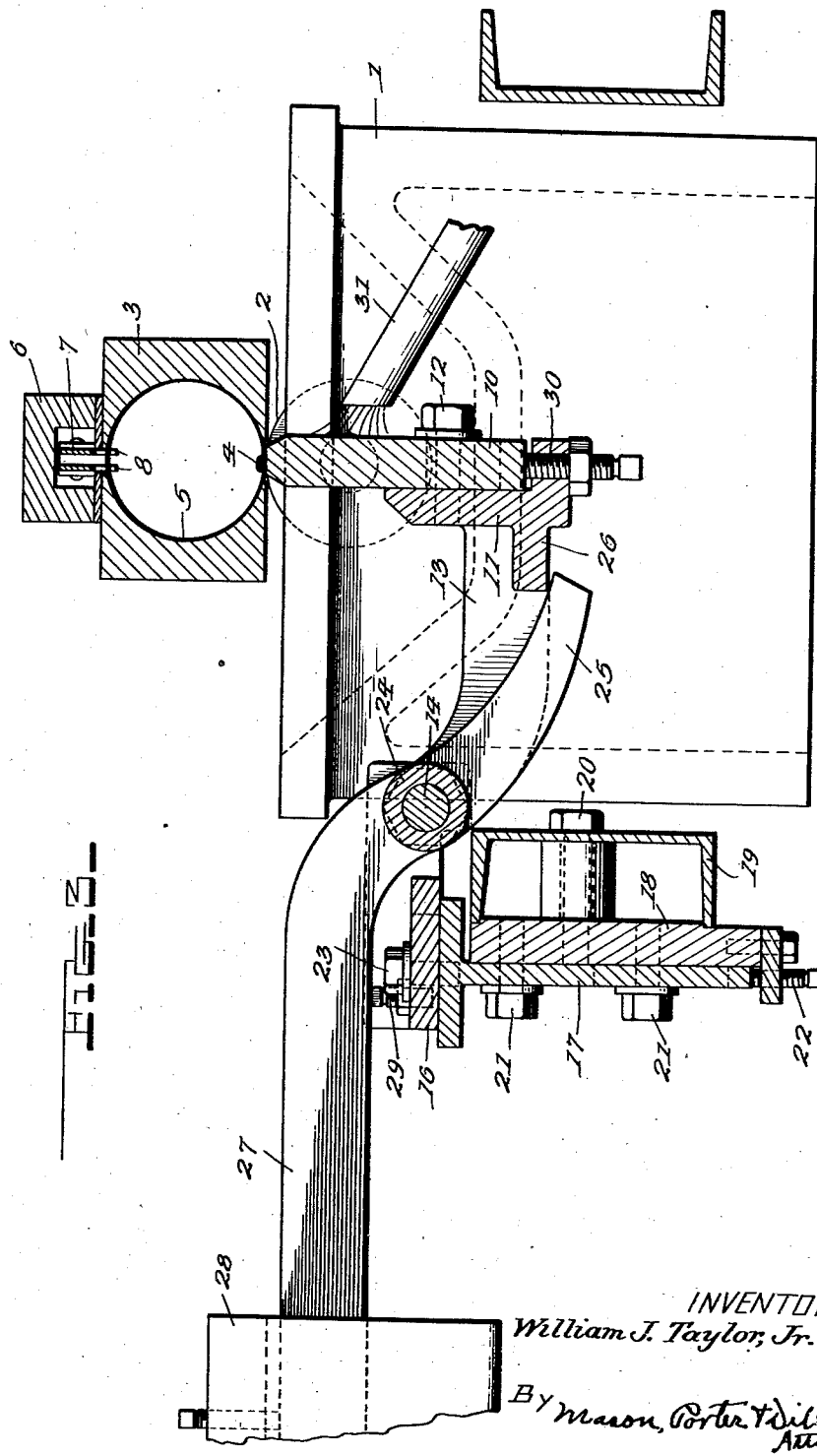

Patented Dec. 16, 1947

2,432,834

UNITED STATES PATENT OFFICE 2,432,834

SOLDERING MACHINE

William J. Taylor, Jr., New York, N. Y., assignor to Continental Can Company, Inc., New York, N. Y., a corporation of New York Application May 17, 1945, Serial No. 594,276

3 Claims. (Cl. 113—61)

1

The invention relates to new and useful improvements in a solder bonding machine for applying solder to the side seam of can bodies, and more particularly to a machine wherein the solder is applied by moving the can body along a roll rotating in a bath of solder.

An object of the invention is to provide a machine of the above type with a more efficient means for removing solder adhering to the outer face of a can body in the region of the side seam.

A further object of the invention is to provide a machine of the above type with a heated iron which contacts with the can body in the region of the side seam immediately after the application of solder thereto for sweating the solder into the side seam parts and for reclaiming surplus solder adhering to the outer face of the can body.

These and other objects will in part be obvious and will in part be hereinafter more fully described.

In the drawings:

Figure 2 is a view partly in side elevation and partly in section of the portion of the solder applying machine shown in Figure 1;

Figure 3 is a sectional view on the line 3—3 of Figure 2.

Figure 1:
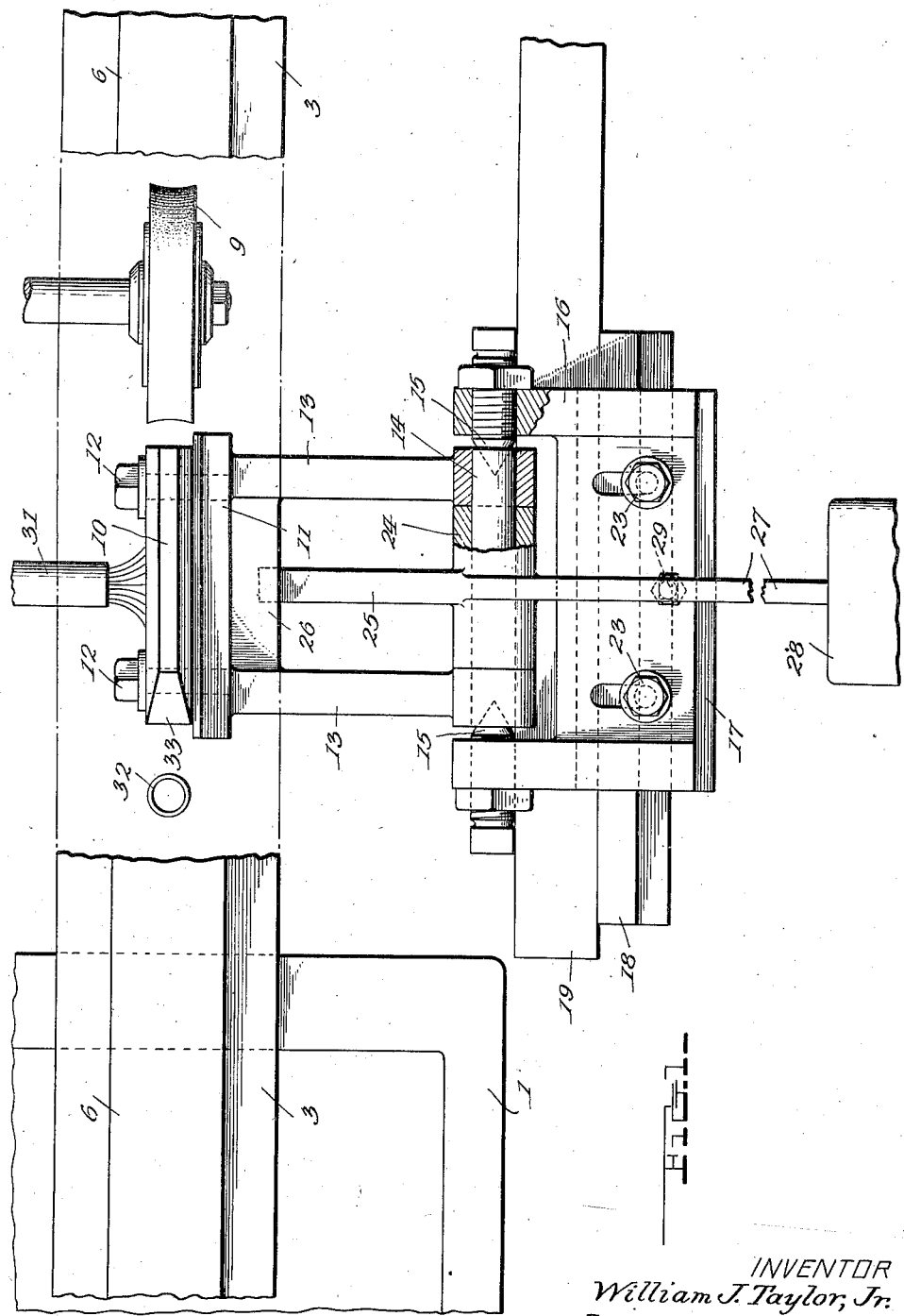
Figure 1 is a view partly in top plan and partly in section showing a portion of the solder applying machine with the improvements applied thereto.

The solder applying machine is of the usual well known type and includes a tank 1, in which is a molten solder bath. Rotating in the solder bath is a solder applying roll 2. The roll is partly submerged in the solder bath as shown in Figure 3. An outside horse extends lengthwise of the tank 1 and is so disposed relative to the solder applying roll 2 that can bodies may be supported and guided through the horse and in contact with the molten solder on the solder applying roll 2. The horse is indicated at 3 in the drawings. This horse is made in two sections and the sections are spaced at both sides thereof so that the seam 4 of the body 5 will be exposed through the space between the sections and will contact with the molten solder on the solder roll.

Directly above the horse is a channel member 6 through which the conveyor chain 7 passes and the conveyor chain is provided with dogs 8 which contact with the can bodies and move them through the horse. These are well known features of a solder bonding machine wherein the solder is applied by a roll rotating in a bath of

2 solder and further description thereof is not thought necessary.

A solder wiping roll 9 is mounted on the frame of the machine and rotates in contact with the side seam to which the solder has been applied. This solder wiping roll 9 rotates in a counterclockwise direction, as indicated in Figure 2, when the can bodies are traveling from left to right, as indicated by the arrow in this figure. This solder wiping roll is preferably made up of fiber disks and as these fiber disks contact with the surface of the can body in the region of the side seam, solder will be removed therefrom. This solder wiping roll is of the usual character and further description thereof is not thought necessary.

Disposed between the wiping roll 9 and the end of the tank 1 is an iron 10. The iron 10 is secured to a supporting bar 11 by means of bolts 12, 12. This supporting bar 11 is carried by two arms 13, 13 fixed to a shaft 14, which shaft in turn is mounted on cone-shaped studs 15, 15. These studs are in turn mounted in a supporting plate 16 carried at the upper end of a bracket member 17. The bracket member 17 is secured to a supporting plate 18 attached to the frame member 19 of the machine by suitable clamping bolts, one of which is indicated at 20 in Figure 3. The bracket is attached to this supporting plate by bolts 21, 21 which pass through slots in the bracket. The bracket rests on adjustable set screws 22, 22 which may be shifted when it is desired to raise or lower the supporting bracket.

The supporting plate 16 is attached to the bracket by means of bolts 23, 23 which pass through slots so that the supporting member 16 may be adjusted on the supporting bracket.

On the shaft 14 is a sleeve 24 which is provided with an arm 25 extending underneath a laterally projecting lug 26 carried by the supporting bar for the iron 10. This sleeve also carries a rearwardly projecting arm 27 on which is adjustably mounted a weight 28. The arm 27 rests on a stop screw 29. The support for the iron rests on the arm 25 and by adjusting the stop screw 29, the support may be raised and lowered.

The iron 10 is secured to the supporting bar 11 by means of the bolts 12 and may be adjusted up and down by loosening the bolts. The iron rests on two adjustable screws 30, 30. The iron 10 is so placed on the support 11 that when the arm 27 rests on the stop screw 29, said iron will be positioned for contact with the side seams of the can body as they move through the horse 3.

A gas burner 31 is placed alongside the iron 10 and directs a heating flame against the side of the iron so that the iron will be heated to a temperature sufficient to cause solder adhering to the outer face of the can body to be rendered sufficiently fluid so that it will adhere to the iron and flow down the sides of the iron and be collected in a suitable receptacle beneath the same. This heated iron contacting with the can body in the region of the side seam will also heat the metal parts and aid in the sweating in of the solder. It will not only recover some of the solder adhering to the can body, but it will also uniformly distribute the solder along the side seam and it will render the solder in the region where it contacts with the can body sufficiently fluid so that if the solder does not adhere to the iron and run down the sides thereof, it will be removed by the wiping roll which contacts with the side seam area immediately upon the can leaving the heated iron.

It is well known, owing to the scarcity of tin, that silver lead solder is being used to a considerable extent for the solder bonding of a side seam. This silver lead solder has a much higher melting temperature than tin solder and therefore it will cool much quicker to a setting point after leaving the solder roll of the solder bath. It is noted that the solder iron 10 is of considerable length and the solder which tends to set so that it is difficult to wipe the same from the surface of the can, will be rendered fluid by the heated iron so that even when silver lead solder is used, it will be caused to adhere to the iron and flow down over the same and the solder still clinging to the outer face of the can body in the area of the side seam will be in a proper condition so that a wiper roll will remove still more of the surplus solder. As a means for preventing cooling of the solder to a setting point after leaving the solder applying roll, a burner 32 is placed between the end of the tank and the solder iron 10 and directs heat against the solder adhering to the outer face of the can body.

The forward end of the solder iron 10 is tapered as indicated at 33. This enables the iron to be set so that as the can bodies move onto the iron they may be depressed slightly, lifting the arm 27 carrying the weight 28 off from the stop screw 29. In this manner the iron is yieldingly pressed against the outer face of the can body and ensures a proper contact between the can body and the iron.

It is obvious that minor changes in the details of construction may be made without departing from the spirit and scope of the invention as set forth in the appended claims.

I claim:

1. In a soldering machine having a roll rotating in a solder bath for applying solder to the side seam of a can body and means for feeding the bodies through the machine, an iron disposed beneath the path of travel of the can bodies and slidably contacting with the outer face thereof in the region of the seam, a supporting bar on which said iron is mounted for vertical adjustment, pivot arms carrying said bar whereby the bar may be raised and lowered, a lever contacting the bar for raising the same, a weight secured to said lever and operating to raise said bar, and a stop for limiting the extent to which said bar and iron are moved upwardly by the weight.

2. In a soldering machine having a roll rotating in a solder bath for applying solder to the side seam of a can body and means for feeding the bodies through the machine, an iron disposed beneath the path of travel of the can bodies and slidably contacting with the outer face thereof in the region of the seam, a supporting bar on which said iron is mounted for vertical adjustment, pivot arms carrying said bar whereby the bar may be raised and lowered, a lever contacting the bar for raising the same, a weight secured to said lever and operating to raise said bar, a stop for limiting the extent to which said bar and iron are moved upwardly by the weight, and means disposed between said iron and the solder bath for applying heat to the side seam of the can body prior to its contact with the iron.

3. In a soldering machine having a roll rotating in a solder bath for applying solder to the side seam of a can body and means for feeding the bodies through the machine, an iron disposed beneath the path of travel of the can bodies and slidably contacting with the outer face thereof in the region of the seam, a supporting bar on which said iron is mounted for vertical adjustment, pivot arms carrying said bar whereby the bar may be raised and lowered, a lever contacting the bar for raising the same, a weight secured to said lever and operating to raise said bar, a stop for limiting the extent to which said bar and iron are moved upwardly by the weight, means disposed between said iron and the solder bath for applying heat to the side seam of the can body prior to its contact with the iron, and a wiper over which the can body seams are moved after they leave the iron.

WILLIAM J. TAYLOR, Jr.

REFERENCES CITED

The following references are of record in the file of this patent:

UNITED STATES PATENTS

| Number | Name | Date |
|---|---|---|
| 480,256 | Foote | Aug. 9, 1892 |
| 522,256 | Hodgson | July 3, 1894 |
| 702,168 | Williams | June 10, 1902 |
| 725,070 | Good | Apr. 14, 1903 |
| 775,880 | Williams | Nov. 22, 1904 |
| 867,030 | Gardner | Sept. 24, 1907 |
| 934,191 | Krummel | Sept. 14, 1909 |
| 985,151 | Fedders | Feb. 28, 1911 |
| 1,508,077 | Taylor | Sept. 9, 1924 |